Sept. 22, 1953     P. S. YUJUICO ET AL     2,652,996
AIRCRAFT COCKPIT CANOPY
Filed May 17, 1949     3 Sheets-Sheet 1
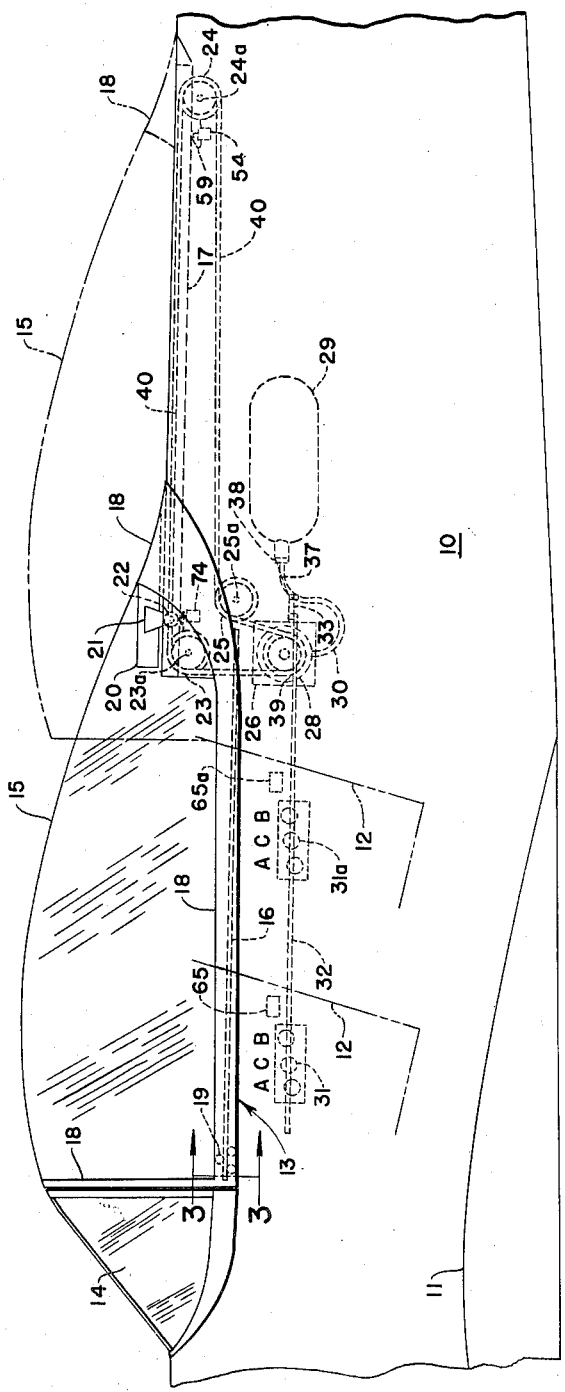
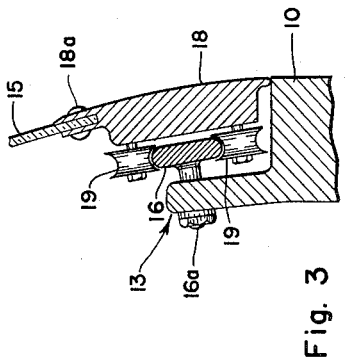
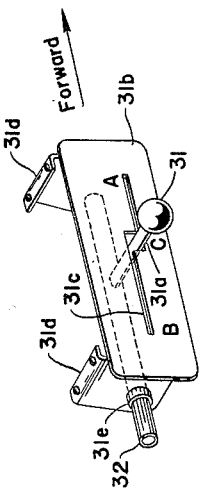
Pedro S. Yujuico &
Charles F. U. Stoner
*INVENTOR.*
BY James M. Clark
THEIR PATENT ATTORNEY.

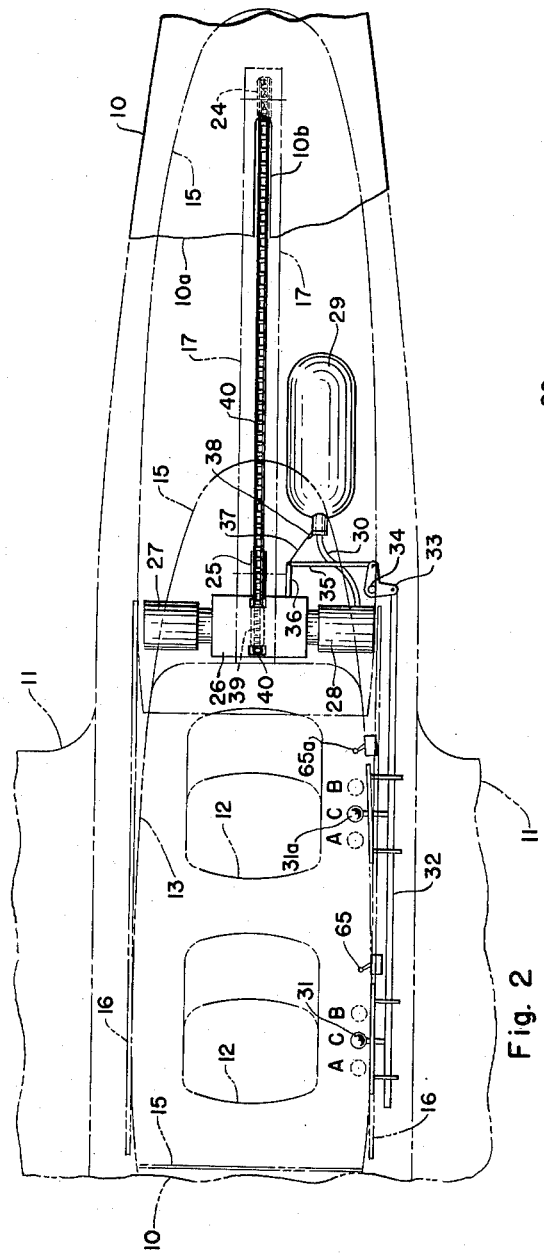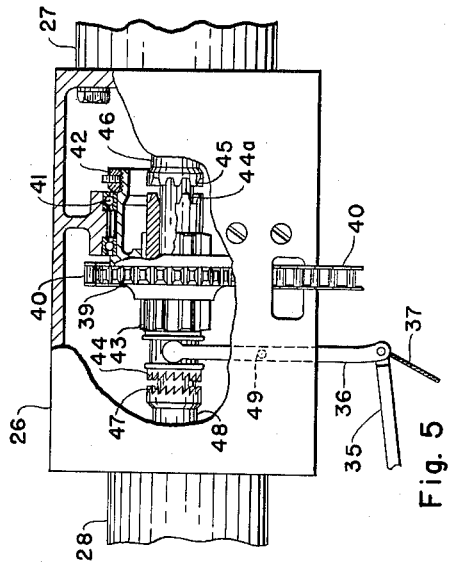

Sept. 22, 1953
P. S. YUJUICO ET AL
2,652,996
AIRCRAFT COCKPIT CANOPY
Filed May 17, 1949
3 Sheets-Sheet 3
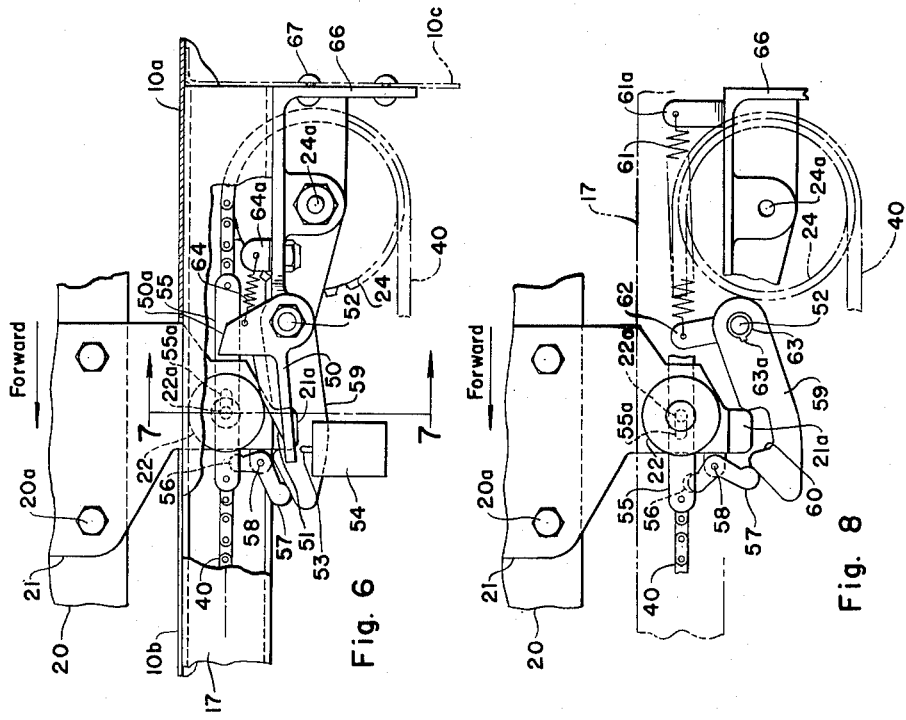
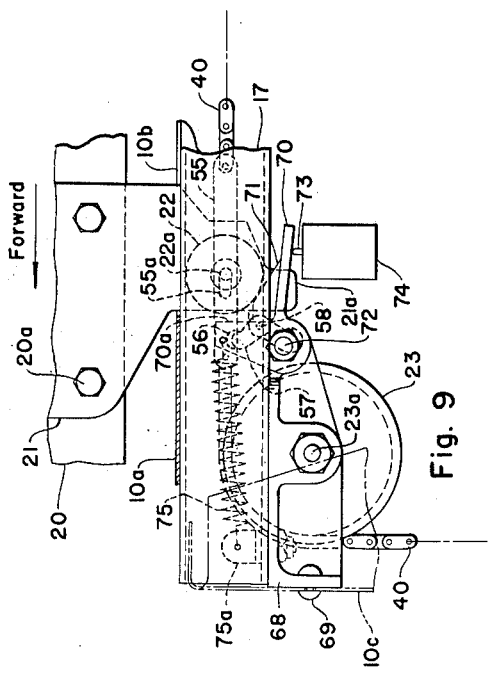
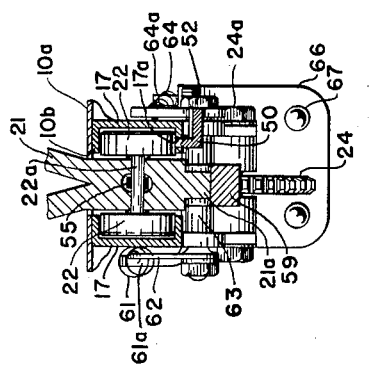
Pedro S. Yujuico & Charles F. U. Stoner
*INVENTOR.*
BY *James M. Clarke*
THEIR PATENT ATTORNEY.

Patented Sept. 22, 1953

2,652,996

UNITED STATES PATENT OFFICE 2,652,996

AIRCRAFT COCKPIT CANOPY

Pedro S. Yujuico, Hagerstown, Md., and Charles F. U. Stoner, Waynesboro, Pa., assignors to Fairchild Engine and Airplane Corporation, a corporation of Maryland Application May 17, 1949, Serial No. 93,646

12 Claims. (Cl. 244—121)

The present invention relates to aircraft cockpit canopies and closures and more particularly to improvements in the operating and control mechanisms for such closures.

Aircraft have generally been classified as to the nature of the accommodations for the occupants into either of two types, namely, "open-cockpit" and "cabin" types. In the early days of the aircraft art, after the transition from the open framework type fuselage to an enclosed fuselage, the occupants usually were seated in the fuselage in what came to be known as the cockpit. The head, and at times the shoulders, of the occupant was usually exposed and in the open, and various types of windshields were used in front of the occupant at the forward end of the cockpit to shield him against the discomforts and hazards of exposure to the airstream. As the airplane became more fully developed the trend toward enclosing the occupants in a cabin prevailed and this type of accommodation has predominated more recently in commercial and pleasure types of aircrafts. However, it is well known that the open cockpit has certain advantages for military use, particularly for fighters and aircraft used for the training of pilots to operate the fighter types. In more recent years the cockpits of these fighter and pursuit types have often been covered by transparent hoods with suitable mountings for opening and closing the hoods or closures, and more recently during World War II, a closure known as the "bubble canopy" was developed and used very extensively. The latter canopies are usually constructed or formed from substantially a single piece of transparent plastic material of a shape which resembles a portion of a large transparent bubble, from which it derives its name.

Bubble canopies have the advantage of being simple in construction; relatively easy to seal against leaks because of fewer joints; they may be molded or shaped to offer a minimum resistance to the airstream in flight; and they further give the ultimate in visibility for the occupants of the aircraft. Certain of these canopies have been designed to hinge along one edge for movement into their open and closed positions and others have been slidably mounted in tracks for fore and aft movements with respect to the cockpits. The opening of the canopy or closure has been accomplished by power means but more frequently they have been manually operated. The sliding type of canopy is usually mounted on tracks at four points on rollers and requires very accurate alignment to prevent binding upon the tracks, especially when the canopy is quite large such as those used on two-place tandem type aircraft. In the operation of all aircraft, particularly those of the military types, quick and positively opening means must be available for use in an emergency and this requirement has always presented a major problem.

The present invention is directed to an improved aircraft cockpit closure of the sliding type having improved operating and control mechanism and eliminates many of the disadvantages and objections found in prior designs. A preferred embodiment of the present invention, which satisfies all of the above referred to requirements, consists essentially of a substantially one-piece transparent, sliding bubble canopy supported at three points by rollers on rails with means for automatically locking the canopy in both its open and closed positions. The canopy is driven along the rails through its attachment to an endless chain or similar flexible means which is engageable with an electric motor through a suitable gear reduction for normal power operation, or alternatively it can be driven by an air motor, operated from a compressed air supply to open the canopy for emergency use. In the present closure arrangement it is also possible for the occupants to selectively disengage the canopy from either power supply source and to move the canopy between its open and closed positions, and vice versa, by manual means. The arrangement includes a clutch disposed between the two power sources, permitting selective operation by either power source, as well as movement of the clutch into a neutral position which permits manual operation of the canopy by the occupants.

It is accordingly a primary objective of the present invention to provide a cockpit closure or canopy which will offer maximum visibility and protection of the occupants and which may be readily opened and closed, either manually or by power means, and automatically and securely locked in its opened and closed positions. It is a further object to provide a sliding canopy with a three-point mounting upon three parallel rails to eliminate any binding due to faulty alignment or distortion of the canopy or fuselage. A further object of the present invention resides in providing power means to open and close the canopy and to lock the same at any desired point between its open and closed positions. It is a still further object to provide a separate independent power means for the opening of the closure in the event of an emergency. It is a corollary objective to provide a selective control of a positive and foolproof type which is readily available to either occupant of the craft for the manual, power, or emergency operation of the closure.

Other objects and advantages of the present invention will occur to those skilled in the art after reading the present description taken in conjunction with the accompanying drawings, forming a part hereof, in which;

Fig. 1 is a side elevation of the fuselage portion of an airplane equipped with a form of the improved cockpit closure, Fig. 2 is a plan view of the same with the canopy and rail structure shown in phantom and portions of the operating mechanism removed for purposes of clarity, Fig. 3 is an enlarged cross sectional detail view of one of the track mountings as taken along the lines 3—3 of Fig. 1;

Fig. 4 is a perspective view of one of the shiftable clutch control knobs;

Fig. 5 is a plan view of the clutch and power drive assembly partially broken away to show the clutch mechanism;

Fig. 6 is a side elevational view of the rear locking mechanism for maintaining the canopy in its locked opened position;

Fig. 7 is a cross sectional view of the mechanism shown in Fig. 6 as taken along the lines 7—7 thereof;

Fig. 8 is a similar view of the mechanism as shown in Fig. 6 but showing the same in the unlocked position after the canopy has started to move forward; and Fig. 9 is a similar side elevational view of the mechanism at the forward or closed position of the canopy showing the power cut-off means and the canopy locking mechanism.

Referring now to the preferred embodiment of the invention shown in Figs. 1 and 2, the numeral 10 indicates the airplane fuselage from which extend conventional wings 11. The fuselage 10 is provided with a pair of tandem disposed seats 12 within the cockpit opening 13 at the forward end of which there is provided a fixed windshield portion 14. Immediately to the rear of this windshield, and covering the cockpit when in the closed position, there is provided a substantially one-piece transparent bubble canopy or cockpit closure 15. Adjacent the edges of the cockpit 13 there are disposed a pair of opposite side rails 16 securely attached to the fuselage structure 10, one on each side of the cockpit, and extending in the fore and aft direction parallel to each other substantially the full length of the cockpit 13. A third rail or track formed from a pair of parallel channels facing each other, forms the third and centrally disposed guide means to the rear of the cockpit opening 13 and at a somewhat higher elevation than the rails 16 due to the transverse curvature of the fuselage and its intersection with the bubble canopy. The track 17 is also securely supported from the fuselage framework 10c being disposed adjacent to and beneath the fuselage skin 10a and the longitudinal slots provided therein at 10b. The tracks 17 are mounted symmetrically about the longitudinal center line of the fuselage 10, being centrally and rearwardly disposed but parallel with respect to the two laterally spaced forward rails 16 disposed at a slightly lower elevation.

The transparent canopy 15 is provided with a suitable metallic framework 18 to which it may be riveted or otherwise attached as indicated at 18a in Fig. 3. As also shown in the latter figure the lower edge of frame 18 has three rollers 19 pivotally mounted thereon, preferably in the spaced relationship indicated in Fig. 1, which rollers 19 engage the rail 16 from both its upper and lower sides and are free to roll therealong while confining the attached canopies 15 to a fore and aft rectilinear path. At the rear end of the frame 18, as shown in detail in Figs. 1 and 2, there is attached thereto a carriage assembly comprising a bracing structure 20 and the downwardly extending bracket assembly 21 secured thereto by means of the attachment bolts 20a.

The bracket assembly 21, as may be more clearly shown in Figs. 6 to 9 inclusive, has a downwardly extending tongue portion 21a for engagement with the automatic terminal locks at the fore and aft limits of movement of the canopy and the attached bracket assembly and it is also provided with a pair of rollers 22 pivotally mounted upon the transverse axle 22a which rollers are of such diameter and lateral spacing that they fit with a predetermined clearance within the channel rails 17 at each side of the canopy bracket member 21, by means of which the rear portion of the canopy 15 is also caused to follow a fore and aft rectilinear path parallel to its forward support mountings by the rollers 19. This provides a mounting system of three spaced points thereby giving tripod or three point stability to the mounting and reducing the adjustment requirements and binding possibilities to a minimum.

The conveyer or endless chain system for moving the canopy 15 between its fore and aft positions is comprised essentially of a series of sprockets and sheaves over which the endless chain 40 is caused to be guided and by means of which the chain and the canopy may be locked. A sprocket 23 is pivotally mounted upon the pivot pin 23a upon the aircraft structure 10c on the fore and aft center line of the fuselage 10 adjacent the rear of the cockpit 13 and at the forward end of the track 17 and the slot 10b in the fuselage skin 10a. For convenience the general arrangement of the conveyor mechanism is shown in Figs. 1 and 2 and the details of the fore and aft sprocket and sheave mountings are shown in Figs. 6 to 9 inclusive. A similar sprocket 24 is pivotally mounted at 24a at the rear of the cockpit 13 toward the tail portion of the airplane, the details of this mounting being shown in Figs. 6, 7 and 8. An idler sprocket or sheave 25 is pivotally mounted upon the fuselage structure at 25a somewhat lower and aft of the head sprocket 23 and serves as a guide for the lower strand of the endless chain 40.

Referring now to Fig. 5 there is disclosed a clutch mechanism assembly 26 having attached to one side, an electric motor 27, and to the opposite side a compressed air motor 28. A compressed air supply container or bottle 29 (Fig. 2) is connected by a conduit 30 to the air motor 28 for driving the same. Control knobs 31 and 31a are located in the cockpit convenient to the occupant as shown in Figs. 1 and 2, and as shown in detail in Fig. 4. These knobs are attached to a longitudinally extending tubular push-pull rod 32 by means of the arm 31a which extends through a slot 31c within a mounting or face plate 31b. The latter is supported from the fuselage structure by means of the brackets 31d which are suitably apertured as at 31e to provide guides through which the rod 32 may be moved fore and aft. The slot 31c forms a guide with an enlarged intermediate central portion at position "C" within which the arm 31a may be retained or shifted either forwardly toward the position "A" or rearwardly towards the position "B" from the central position "C."

The opposite or aft end of the push-pull rod or link 32 is pivotally attached to a first arm of a bell-crank 33 pivotally mounted at 34, the other arm of the bell crank 33 being pivotally connected to a shorter transverse link 35, in turn pivotally connected to the clutch lever 36. A cable 37 is attached at one end to the clutch lever 36 and at the other end to a lever operated valve 38 on the compressed air bottle 29 to open the valve on the bottle permitting the escape of the contents therefrom simultaneously as the clutch lever 36 is shifted into the position in which the emergency air motor engages the chain drive mechanism. It will accordingly be noted that with the knob 31 in its forward or "A" position the clutch in the unit 26 engages with the motor 27 for electric power drive of the canopy 15; and when it is in the intermediate or "C" position the clutch is in neutral without engagement of either motor and the canopy can be operated manually. When moved to the rearmost position at "B" for emergency use the bell-crank 33 is rotated counterclockwise, as viewed in plan in Fig. 2, the air motor 28 is engaged by the clutch, and the cable 37 causes opening of the valve 38 permitting compressed air from the bottle 29 to be fed through the conduit 30 into the air motor 28.

Referring now to Fig. 5 the clutch includes a drive sprocket 39 (shown also in Figs. 1 and 2) and the lower forward portion of the endless chain 40, which engages the idler sprocket wheels 23, 24 and 25, being attached to the carriage bracket 21 of the canopy and engaged and driven by the driving sprocket 39. Fig. 5 shows the clutch mechanism partially cut away by which is accomplished the selective operation of the electric motor 27, or the air motor 28 for driving the sprocket 39. The sprocket 39 is journalled within a bearing generally indicated at 41 and locked in position by the retaining ring 42 to permit rotation in one plane only. The drive sprocket 39 has internal spur teeth cut therein to match with and engage the external spur teeth on a tubular floating shaft 43. The latter is provided with ratchet teeth 44 and teeth 44a for engagement with the ratchet teeth 47 and teeth 45 on the air motor shaft 48, and the electric motor shaft 46, respectively. The ratchet teeth 44—47 are arranged to be driven in one direction only namely the rearward emergency movement of the canopy. The clutch lever 36 is pivotally mounted at 49 and has its inner end bifurcated and riding in a groove in the shaft 43 such that pivotal movement of the lever 36 will cause the shaft 43 to move either toward the left into engagement with the shaft 48 or toward the right into engagement with the shaft 46. Both the electric motor 27 and the air motor 28 have reduction gears associated therewith to drive their respective shafts at relatively low speed and each are irreversible. The electric motor 27 is reversible as to its rotation but the air motor 28 rotates only in the clockwise direction as viewed in Fig. 1.

Fig. 6 shows, in a partially cut away view, the rear locking mechanism adjacent the guide sheave 24. Mounted on one side of the rail 17 is a cam lever 50 pivotally mounted upon the pivot bolt 52, the lever 50 having a cam portion 51 and an upwardly extending stop portion 50a. The cam portion 51 extends through an opening 17a cut through the bottom flange of the nearest channel rail 17 such that the roller 22 in rolling rearward on the rails 17 strikes the cam 51. This causes the lever 50 to be deflected downwardly in the counterclockwise direction about its pivot 52 into contact with the plunger 53 of a limit switch 54 which serves to shut off the electric motor 27. A tension spring 64 is interconnected between the upstanding portion 50a of the cam lever 50 and an abutment or spring terminal 64a, urging the cam lever 50 in the clockwise direction. Accordingly rearward movement of the rollers 22 initially deflects the cam lever 50 downwardly into contact with the plunger 53 by engagement of the roller with the cam face 51, shutting off the electric power, further movement of the bracket carriage 21 rearwardly being limited by engagement of the roller 22 with the upstanding portion 50a of the cam lever 50. The endless chain 40 is attached to the bracket carriage 21 by an elongated link 55 which is moved longitudinally fore and aft with the chain 40 between the positions shown in Figs. 6 and 9 without ever running over or engaging either of the sprockets 23 and 24. The link 55 is provided with a cut-off portion 56 in the lower surface of its forward end and a pawl 57, pivotally mounted at 58 upon the carriage bracket 21, rides in the slot 56 when the canopy is in its locked open position as shown in Fig. 6. In addition to the locking action of the irreversible gears in the electric motor 27, the canopy is locked as a safety measure in its open position by the lever 59 which is also pivotally mounted on the pivot bolt 52. The tongue portion 21a on the lower end of the carriage bracket 21 is arranged to latch into or engage a cut-off 60 provided in the upper portion of the locking lever 59 and when so engaged prevents movement of the carriage bracket 21 (or the attached canopy 15) in either direction. The lever 59 is normally urged upwardly, or in the clockwise direction about the pivot 52, by the spring 61 attached to the arm 62 of the tubular shaft 63 locked to the lever 59 by the keyway 63a.

By reference to Fig. 8 it will be noted that the link 55 is slotted at 55a at its point of attachment to the carriage bracket 21 by the axle 22a to allow a slight longitudinal movement of the chain 40 relative to the bracket for unlocking purposes. As the chain 40 moves forward, the pawl 57 is caused to rotate in the counterclockwise direction about its pivot 58 forcing the lever 59 downwardly as indicated in Fig. 8 to permit release of the tongue portion 21a from the recess 60 within the lever 59 and thereby allowing the canopy to move forward or to the left in this figure. The lever 59 is then permitted to turn to its normal position under the influence of the tension spring 61 interconnecting the arm 62 with the spring abutment 61a in turn supported from the bracket 66 secured to the fuselage framework 10c as by the rivets 67.

Fig. 9 shows the canopy attachment assembly 20—21 in its forward or closed position, and the manner in which the power supplied to the electric motor is cut-off and the carriage assembly 21 retained in the forward position, the operation being essentially the same as that shown in connection with Fig. 6 with the canopy in its open position. As shown in Fig. 9, as the canopy is moved forwardly by forward movement of the upper strand of the chain 40 through the intermediacy of the roller axle 22a engaging the slot 55a in the chain link 55, and the rollers 22 being guided within the channel elements of the track 17, the rollers engage the cam surface 71 of the cam lever 70 pivotally mounted on the pivot bolt 72, deflecting the same downwardly in the clockwise direction to depress the plunger 73 of the limit switch 74 thereby cutting off the power supply to the electric motor and causing the canopy to be locked in that position by the irreversibility of the gears in the electric motor 27. As in the case of the stop and limit mechanism at the rear end of the chain conveyor system, the mechanism at the front end as shown in Fig. 9 also permits the overrunning by the carriage bracket 21 slightly, due to the slotted hole 55a in the link 55 and return of the cam lever 70 in the counterclockwise direction to its normal position under the influence of the tension spring 75 interconnecting the upstanding portion of the lever 70a with the spring terminal fitting 75a. The head sprocket 23 is pivotally mounted at 23a upon the bracket fitting 68 attached to the fuselage structure 10c as by means of the rivets 69. While the limit switches 54 and 74 serve to stop the electric motor 27 at each of the terminal positions of the canopy and its attached carriage bracket 20—21, the motor 27 is controlled by means of the three-way toggle switch 65 adjacent the forward seat 12 and supplemented by a similar switch 65a adjacent the rear seat.

In operation, in order to open the canopy from the closed position shown in Fig. 1, the knob 31 adjacent the forward seat (or the knob 31a adjacent the rear seat) is moved to the forward position marked "A" for normal power operation. This movement, through the bell-crank 33 and its linkage 35 moves the clutch lever 36 to the left as viewed in Fig. 5 which slides the floating shaft 43 into engagement with the shaft 46 of the electric motor 27 by engagement of the teeth 44a with the teeth 45. Subsequently when the operator closes the three-way toggle switch 65 (or 65a), the electric motor 27 becomes energized and rotates in the selected direction rotating the drive sprocket 39 and causing the canopy 15 to move rearward into its opened position. As the carriage bracket 21 reaches its rearmost position the roller 22 engages the cam face 51 of the cam lever 50 causing it to be deflected downwardly and to depress the plunger 53 thereby operating the limit switch 54 and shutting off the current to the motor. At the same time the tongue portion 21a of the carriage bracket 21 is latched within the recess 60 of the lever 59 and through the further medium of the pawl 57 engaging the recess 56 in the link 55 the canopy is securely locked in its rearmost or open position. The canopy may of course be opened to any intermediate position between its fully closed and fully open position and stopped at that intermediate position by releasing pressure on the toggle switch and permitting it to return to its central neutral or open position. When it is again desired to move the canopy either forward or rearward from such intermediate position it is only necessary to push the toggle switch either forward or rearward to cause rotation of the reversible electric motor in the proper direction. The canopy is also securely locked in any intermediate position through the irreversibility of the gearing in the drive of the reversible electric motor, while at the same time the clutch teeth 44a and 45 are engaged thereby locking the canopy through the chain system to the motor.

In the event of failure of the electrical system, or in an emergency, the operator may move the knob 31 (or its counterpart 31a) to the "B" position in which it serves to shift the clutch into engagement with the air motor 28 and simultaneously pulls the cable 37 which opens the valve 38 and releases the compressed air from the bottle 29 to drive the air motor and move the canopy rearward. Alternatively, by moving the knob 31 to the central or neutral position at "C" the clutch mechanism is shifted to neutral and the canopy may be freely slid into its open or closed positions manually inasmuch as it is then disengaged from the irreversible gearing in either of the motor drives.

While a preferred embodiment of applicants' improvement has been described above it will be appreciated that other forms and modifications of the present invention, both with respect to its general arrangement and the details of its respective parts, will occur to those skilled in the art after reading the above description and are intended to come within the scope and spirit of the present invention as more particularly set forth in the appended claims.

We claim:

1. In an aircraft canopy mounted for movement between extreme opened and closed positions, power means for the normal opening and closing movements of said canopy, emergency power means for the movement of said canopy in an emergency, manual means for opening and closing said canopy, selective control means for disengaging either or both said power means for the manual opening and closing of said canopy, automatic locking means for retaining said canopy in its extreme positions, and irreversible means associated with said normal power means for retaining said canopy in its intermediate positions.

2. In aircraft, a canopy mounted for movement between opened and closed positions, power means operatively connected to said canopy for the normal movement of said canopy between said opened and closed positions, locking means engageable with said canopy for automatically retaining said canopy in said opened position, limit means actuated by said canopy in said opened position for shutting off said power means and lost motion means operatively connected to said canopy arranged for automatically unlocking said canopy at said opened position upon initial return movement of said canopy from said opened position.

3. In an aircraft cockpit canopy installation including a fuselage having a cockpit opening therein, a movable cockpit canopy for said cockpit opening formed from a substantially one-piece transparent cover, a frame supporting said cover, a plurality of substantially parallel tracks supported from said fuselage, a plurality of rollers rotatably mounted upon said canopy frame in engagement with said tracks for rolling contact therewith, an electric motor connected to an electric power source, a fluid motor connected to a fluid pressure source, irreversible reduction gearing associated with said electric motor, further irreversible reduction gearing associated with said fluid motor, clutch means operatively associated with said electric motor and said fluid motor, a continuous flexible transmission means attached to said canopy frame guided for movement in the direction of said tracks, drive means in engagement with said flexible transmission means selectively driven by either said motor dependent upon said clutch means position, and control means for the selective operation of said clutch means.

4. In aircraft, a sliding closure mounted for reciprocating movements with respect to the aircraft, power means operatively connected to said closure for the normal movements of said closure, emergency power means including a valved source of fluid pressure operatively connected to said closure for its movement into an opened position in an emergency, said power and emergency power means including coaxially mounted motors, and control means including a shiftable element coaxially mounted with respect to said motors for selectively operating said closure by either said normal power means or said emergency power means.

5. In an aircraft closure mounted for movements between opened and closed positions, electric power means operatively connected by a shiftable clutch member to said closure for its movements between open and closed positions, manual means for moving said closure, fluid power means operatively connected by said shiftable clutch member to said closure for its movement into an opened position, manual means for opening and closing said closure, and selective control means operatively associated with said shiftable clutch member for disengaging said closure from either of said operative connections to said power means for the manual movement of said closure.

6. In an aircraft cockpit canopy, a canopy mounted for movement between open and closed positions, rotary drive means operatively connected to said canopy, power means operatively connected to said drive means for the normal opening and closing movements of said canopy, emergency power means operatively connected to said drive means for movement of said canopy into an opened position in an emergency, means for limiting said emergency opening movement, manual means for opening and closing said canopy, and selective control means for conditioning said drive means for either normal power, emergency power or manual actuation of said canopy.

7. In an aircraft canopy mounted for movements between opened and closed positions, power means including a first motor for the normal opening and closing movements of said canopy, emergency power means including a second motor fixedly supported upon the aircraft for the movement of said canopy in an emergency, said motors having opposed clutching elements mounted for rotation on an aligned axis manual means for opening and closing said canopy, and selective control means including a clutch intermediately disposed between said motor clutching elements for disengaging either or both said power means for the manual operation of said canopy.

8. In an aircraft, a canopy mounted for movement with respect to the aircraft, electric power means operatively connected to said canopy for said movement, fluid power means operatively connected to said canopy for said movement, selective control means for conditioning said canopy for operation by either said electric power means or said fluid power means, and irreversible means associated with both said power means arranged in such manner that said canopy is locked to said aircraft through either of said power means in its inoperative condition.

9. In an aircraft canopy mounted for reciprocating movements, power means for the normal movement of said canopy, emergency power means for the movement of said canopy in an emergency, manual means for opening and closing said canopy, selective control means for disengaging either or both said power means for the manual opening and closing of said canopy, automatic locking means for retaining said canopy in its extreme positions, and irreversible means associated with said normal and emergency power means for retaining said canopy in any of its intermediate positions.

10. In aircraft, a canopy mounted for reciprocating movements with respect to the aircraft, power means operatively connected to said canopy for the movement of said canopy between open and closed positions, locking means engageable with said canopy for automatically retaining said canopy in said open and closed positions, limit means actuated by said canopy upon reaching either said opened or closed positions for interrupting said power means, and lost-motion means operatively connected to said canopy for automatically unlocking said canopy at either said position and restoring said interrupted power means upon initial return movement of said canopy from either said position.

11. In an aircraft a cockpit canopy installation including a fuselage having a cockpit opening therein, a movable cockpit canopy for said cockpit opening, a plurality of substantially parallel tracks supported from said fuselage, a plurality of rollers rotatably mounted upon said canopy in engagement with said tracks for rolling contact therewith, an electric motor connected to an electric power source, a fluid motor connected to a fluid pressure, irreversible drive means associated with said electric motor, further irreversible drive means associated with said fluid motor, clutch means operatively associated with said electric motor and with said fluid motor for driving said canopy by either said motor depending upon said clutch means position, and control means for the selective operation of said clutch means.

12. A canopy arrangement for an aircraft having an opening therein, means for mounting said canopy upon the aircraft for movements between its opened and closed positions with respect to said opening, drive means including a toothed element operatively connected to said canopy, power means normally engaged with said drive means for moving said canopy between its open and closed positions, emergency power means operatively connectable with said drive means for moving said canopy into its open position, said drive means including an axially shiftable hub portion having jaw clutch means disposed at each end of said hub portion co-axially mounted with said power means and with said emergency power means, and control means operatively connected to said shiftable hub portion for selectively engaging said normal power means and said emergency power means for the operation of said canopy.

PEDRO S. YUJUICO.
CHARLES F. U. STONER.

References Cited in the file of this patent
UNITED STATES PATENTS

| Number | Name | Date |
|---|---|---|
| 2,479,713 | Beach | Aug. 23, 1949 |
| 2,482,004 | King | Sept. 13, 1949 |
| 2,505,651 | Roth | Apr. 25, 1950 |

FOREIGN PATENTS

| Number | Country | Date |
|---|---|---|
| 505,651 | Great Britain | Sept. 28, 1943 |